United States Patent [19]

Obermeier et al.

[11] Patent Number: 4,880,484
[45] Date of Patent: Nov. 14, 1989

[54] METHOD FOR MANUFACTURING AND MARKING CABLE

[75] Inventors: Manfred Obermeier, Eckental; Erhard Herrmann, Heroldsberg, both of Fed. Rep. of Germany

[73] Assignee: Kabelmetal Electro GmbH, Hanover, Fed. Rep. of Germany

[21] Appl. No.: 272,905

[22] Filed: Nov. 18, 1988

[30] Foreign Application Priority Data

Dec. 22, 1987 [DE] Fed. Rep. of Germany ....... 3743470

[51] Int. Cl.⁴ .................... H01B 13/00; H01B 7/36
[52] U.S. Cl. .................................. 156/51; 156/64; 174/112
[58] Field of Search .................. 156/51, 64; 174/112; 324/59

[56] References Cited

U.S. PATENT DOCUMENTS

| | | | |
|---|---|---|---|
| 3,197,554 | 7/1965 | Baker | 174/112 |
| 4,543,448 | 9/1985 | Devrloo | 174/112 |
| 4,565,591 | 1/1986 | Shannon | 156/51 |
| 4,659,424 | 4/1987 | Baxter et al. | 156/51 |
| 4,837,405 | 6/1989 | Bonjour et al. | 174/112 X |

Primary Examiner—Robert A. Dawson
Attorney, Agent, or Firm—James C. Jangarathis

[57] ABSTRACT

There is disclosed a method of manufacturing and marking a cable including the steps of drawing a plurality of conductors in a longitudinal direction through an apparatus that affixes a plurality of magnetizable inserts along the length of the conductors with a distribution associated with a plurality of particular locations along the length of such conductors; applying a protective jacket of insulating material about the conductors and affixed magnetizable inserts; and marking the outside of the protective jacket in accordance with control signals generated by a sensing device that detects the presence of each of the magnetizable inserts as the cable is drawn through the sensing device.

11 Claims, 2 Drawing Sheets

METHOD FOR MANUFACTURING AND MARKING CABLE

The invention relates to a method of manufacturing and marking cable comprising a core of electric conductors and/or light wave conductors, and a protective jacket of insulating material upon which markings are selectively placed.

BACKGROUND OF THE INVENTION

An extended length of cable often includes in and along its core, a plurality of "particular locations" separated by interposed longitudinal distances. Examples of such a cable include: a heating cable having heating elements positioned in the core with respect to the particular locations; a measuring cable wherein inductive or temperature sensors are distributed in the core of the cable with respect to various particular locations; and strip cables that have within the particular locations of the core, adjacent insulated conductors held or attached to each other, while the lengths of the conductors within the interposed longitudinal distances are each unattached. In the use of such cable, the recognition of the location of each of the particular locations of the core was rendered difficult, especially for inexperienced personnel, as of the result of the application of the protective outer jacket of nontransparent insulating material applied cicumferentially about the core. Often, a cable to be cut transversely with respect to a particular location of the core would be cut on a trial and error basis, leading to unacceptable waste. With regard to a cable comprising a plurality of conductors having adjacent conductors in the particular sections attached to each other, the areas of such attachments provided "stiff" areas along the cable length. Heretofore, such stiff areas were recognizable by only experienced personnel upon a repetitive bending test. Such repetitive bending not only placed considerable stress on the cable which often damaged the conductors therein, but was especially unacceptable for cables including mechanically sensitive light wave conductors.

OBJECT OF THE INVENTION

The object of the present invention is to provide a method for manufacturing a cable whose core has distributed along its length a plurality of particular locations separated by interposed longitudinal distances, and marking the outer protective jacket of the cable in a manner that the positions at which the particular locations are present are readily recognizable from an observation of the markings on the outer protective jacket.

SUMMARY OF THE INVENTION

The object of the present invention is achieved by a method that includes the steps of drawing a plurality of conductors in a longitudinal direction through station that affixes a plurality of magnetizable inserts along the length of the conductors with a distribution associated with the distribution of a plurality of particular locations along the length of such conductors; applying a protective jacket of insulating material about the conductors and affixed magnetizable inserts; and marking the outside of the protective jacket in accordance with control signals generated by a sensing device that detects the presence of each of the magnetizable inserts as the cable is drawn through the sensing device.

The sensing device controls the marking of the outer surface of the protective jacket in such an accurate manner that each of the markings may be placed either directly above each of the particular locations, or at a predetermined distance from each of such particular locations. Accordingly, the distances between the particular locations may be different, as long as the distances between each of the magnetizable inserts and the associated particular location are not changed. Therefore, the present method may be employed independent of the distances between the particular locations. It is of importance that each of the magnetizable inserts be mounted in a longitudinally limited area of, for example, 2 mm so as to provide error free, recognition of the presence of the inserts by the sensing device.

BRIEF DESCRIPTION OF THE DRAWINGS

A better understanding of the present invention as well as the object and advantages thereof will become apparent upon consideration of the following detailed disclosure thereof, especially when taken with the accompanying drawings; wherein:

Referring in particular to FIGS. 1–4, a cable 1 for transmitting signals is depicted as comprising a plurality of conductors 2 extending parallel to each other, and having adjacent ones thereof placed side by side to form a strip line 3. The term "conductors" includes both insulated electrical conductors as well as light wave conductors. The strip line 3 forms the core of the cable 1 about which is formed an extruded protective jacket 4 (FIGS. 3 and 4). A screen 5 may be provided concentrically about the core of conductors 2 (FIG. 4). Screen 5 may comprise a wire mesh of copper wires having zinc plated thereon; or an aluminum foil with a wire mesh placed thereabout. For the purposes of simplicity, only six conductors are illustrated in FIG. 2, it being self evident that substantially many more may be included. The longitudinal lengths of each of the conductors 2 are divided into a repetitive series of particular locations V extending transverse of the axial direction of the conductors 2, such particular locations V being separated by interposed distances Z. In the particular locations V the insulation of the adjacent conductors 2 are maintained or fixed in a side-by-side orientation to form the strip configuration; while between such particular locations V along the distances Z, the adjacent conductors 2 are not attached to each other but are movable with respect to each other. The relative longitudinal length of each of the particular locations V to that of each of the distances Z may be in the range of 20:1. FIG. 1 illustrates a cable 1 that has had a section of its protective jacket 4 removed from an end thereof that comes within a particular location V. Upon such removal, the ends of the attached conductors 2 at such end are spread, or flattened out, for insertion into a connector frame 7, such frame having a plurality of conductor positions (not shown) corresponding in number and orientation to the ends of the conductors 2.

Referring to FIG. 5, there is depicted one of a plurality of magnetizable strips 8 mounted on the strip line 3 so as to extend within a particular location V. The magnetizable strips 8 preferably comprise iron powder held in place by an adhesive. Alternatively, the iron powder may be applied to foils or other flexible carriers. It is important that the magnetizable strips 8 be flexible and remain so, thus permitting damage free movements of the conductors 2 in the manufacturing process. Further, the iron powder within the magnetizable strips 8 should be insulated from the conductors 2 so as to avoid electric interference.

As illustrated in FIG. 6, magnetizable clamps 9 may be employed as an alternative to the magnetizable strips 8 aforesaid noted. The magnetizable clamps 9 are each mounted at a fixed distance A with respect to an associated particular location V, on one of the outer conductors 2 of the strip line 3. Further alternatives are, of course, apparent, it being recognized that, during the manufacture of the strip line 3, other magnetizable inserts may be used, as long as they have a uniform orientation with the associated particular locations V and meet the requirements of flexibility so as not to do damage to the conductors 2, and are insulated rom the conductors 2, so that no electric interference occurs, and can be clearly detected by an inductive sensor. Further, the magnetizable inserts may be mounted on a separate strand within the core 12 of the cable 1.

Figure 1:
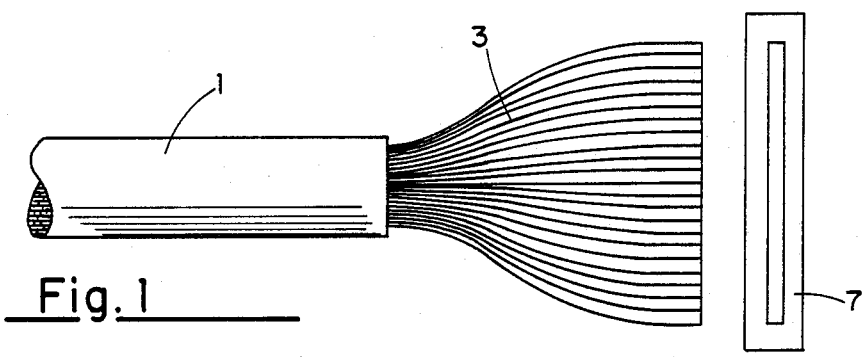
FIG. 1 is a schematic representation of a cable of a type to which the novel method of the instant invention may be employed.
Figure 2:
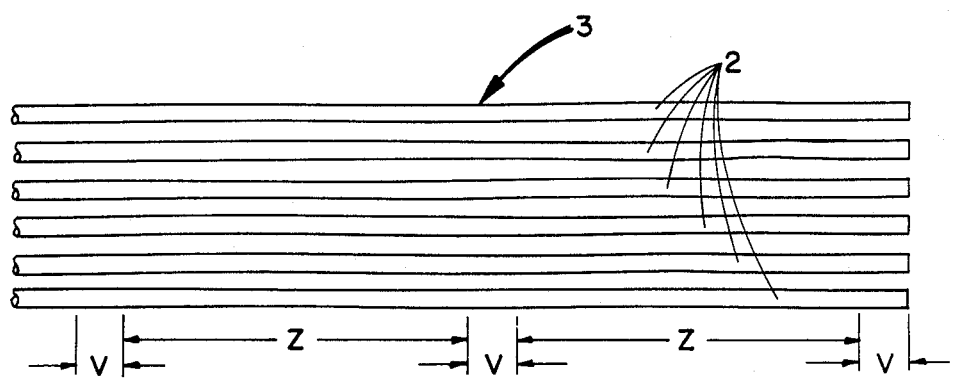
FIG. 2 is a schematic illustration of a strip line comprised of a plurality of conductors.
Figure 3:
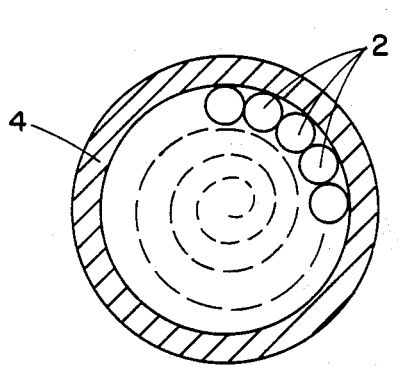
FIG. 3 is a enlarged cross-sectional view of the cable of FIG. 1.
Figure 4:
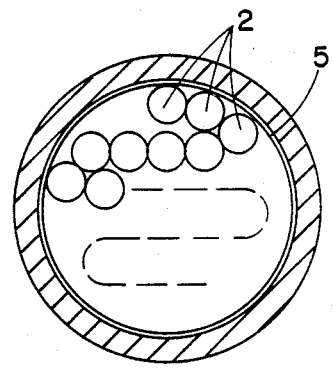
FIG. 4 is an enlarged, cross-sectional view of alternative embodiment of the cable of FIG. 1.
Figure 5:
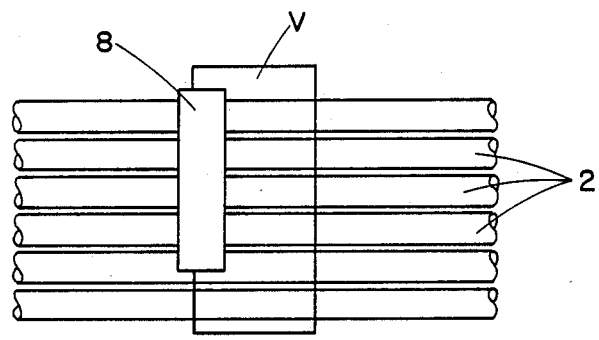
FIG. 5 is a schematic representation of a length of a strip line having a magnetizable strip attached thereto.
Figure 6:
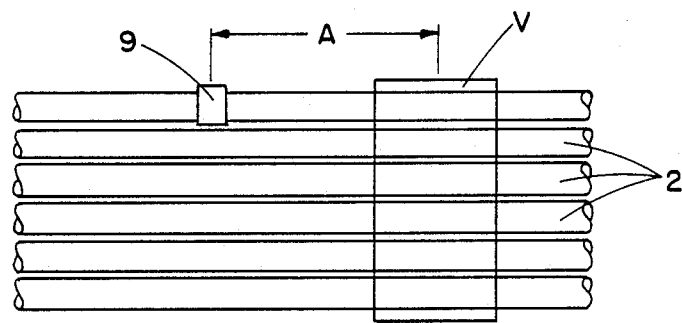
FIG. 6 is a schematic representation of a length of a strip line having a magnetizable clamp attached thereto.
Figure 7:
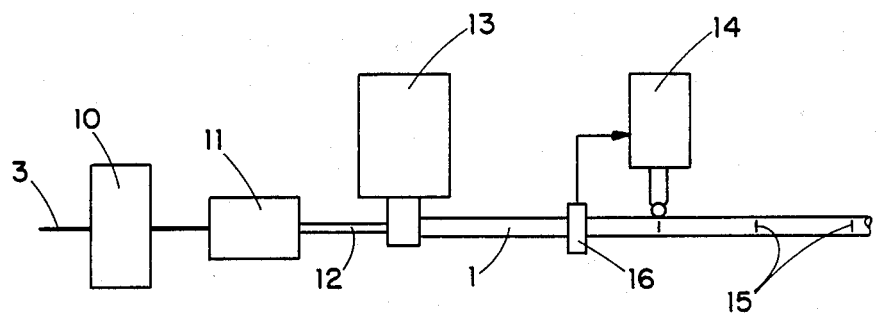
FIG. 7 is a schematic representation of the various work stations for the manufacture of a cable with the employment of the novel method of the instant invention.

The cable 1 of the present invention is manufactured in the following manner:

Referring to FIG. 7, a priorly fabricated strip line 3 is longitudinally drawn through an insert attachment station 10 wherein magnetizable strips 8 as heretofore described with regard to FIG. 5, or magnetizable clamps 9 as heretofore described with regard to FIG. 6, are placed along and attached to the strip line 3 with a fixed orientation with respect to associated particular locations V. The strip line 3 is then drawn through a forming station 11 wherein the strip line 3 is formed into a circular cross-sectional configuration by either winding the strip line 3 laterally as indicated by FIG. 3, or folding strip line 3 laterally as indicated by FIG. 4. The strip line 3 exits the forming station 11 as a cable core 12 and is longitudinally drawn through an extruder station 13 which applies the protective jacket 4 (FIG. 3) directly about the core 12. Alternatively, an additional station (not shown) may be employed prior to the extruder station 13 to form the screen 5 (FIG. 4) concentrically about the core 12, and then forming the protective jacket 4 concentrically about the screen 5.

The cable 1 so formed is drawn from the extruder station 13 through an exterior marking station 14 that selectively places legible markings 15 on the outer surface of the protective jacket 4 of the cable 1. The markings 15 may take the form of lines, dots, crosses or text material of high adherence ink that are disposed within each of the particular locations V of the strip line 3, or at a predetermined distance from each of such locations. For placing the legible markings 15 at the proper locations along the protective jacket 4 of the cable 1, the exterior marking station 14 includes an inductance sensor 16 located so as to sense the magnetizable strips 8, or the magnetizable clamps 9, included in the cable 1 as it longitudinally moves from the extruder station 13 into the exterior marking station 14. The inductance sensor 16 is comprised of a measuring bridge that reacts to changes in magnetic fields as the magnetizable strips 8, or magnetizable clamps 9, of the cable 1 are moved through the inductance sensor 16. The measuring bridge of the inductance sensor 16, is, for example, powered by an A.C. generator of 3 KHZ. Upon each detection of a magnetic field change, the inductance sensor 16 provides a control signal that initiates the marking of the protective jacket 14. Such marking is consummated after a time delay that is in accord with a predetermined displacement of the cable 1 from the point a strip 8 or clamp 9 is sensed, to the location whereat such point is legibly marked by the high adherence ink. The predetermined displacement can be accurately determined, it being dependent upon the known distance between each of the strips 8, or the clamps 9, the known distance of the associated particular locations V from such strips or clamps, and the longitudinal speed of the cable 1.

An alternative arrangement of the strip line may comprise pairs of conductors twisted together in a manner wherein the direction of the twisting is reversed between successive locations. In such arrangement, the strip line comprises a plurality of conductors that are orientated into two adjacent planes within the particular locations V, each of such planes including alternate ones of the conductors.

While the invention has been described in connection with an exemplary embodiment thereof, it will be understood that many modifications will be apparent to those of ordinary skill in the art and that this application is intended to cover any adaptations or variations thereof. Therefore, it is manifestly intended that the invention be only limited by the claims and equivalents thereof.

What is claimed:

1. Method of manufacturing and marking a cable comprising a core including a plurality of parallel extending electric conductors and/or light wave conductors, comprising the steps of:
    drawing a plurality of conductors in a longitudinal direction through a means for affixing a plurality of magnetizable inserts along the length of said conductors, each of said inserts being positioned in association with one of a plurality of particular locations included along said conductors and separated by interposed longitudinal distances;
    drawing said plurality of conductors through a means for applying a protective jacket of insulating material about said conductors and said magnetizable inserts to form a cable; and
    drawing said cable through a means for placing markings along the outside of said protective jacket, said marking means including a sensing means that provides control signals as each of said magnetizable inserts moves through said sensing means.

2. Method in accordance with claim 1, wherein said plurality of conductors extend side by side to form a strip configuration; and further comprising the step of drawing said plurality of conductors with said plurality of magnetizable inserts from said affixing mean through a forming means for shaping said strip configuration into a circular cross-sectional configuration prior to the application of said protective jacket.

3. Method in accordance with claim 1, wherein the particular locations of adjacent ones of said plurality of conductors are affixed to each other.

4. Method in accordance with claim 1, wherein said magnetizable inserts are comprised of iron powder.

5. Method in accordance with claim 1, wherein said sensing means comprises an inductance sensor powered by an alternating current.

6. Method in accordance with claim 1, wherein said magnetizable inserts comprise iron powder included within flexible carriers, each of said inserts being attached to at least one of said conductors and extending transversely within one of said particular locations.

7. Method in accordance with claim 1, wherein each of said magnetizable inserts comprise a magnetizable clamp mounted on at least one of said plurality of conductors between adjacent ones of said particular locations.

8. Method in accordance with claim 1, wherein said magnetizable inserts are mounted on a separate strand extending longitudinally within said conductors.

9. Method in accordance with claim 1, wherein said protective jacket of insulating material is nontransparent.

10. Method in accordance with claim 1, wherein said cable comprises a plurality of heating elements positioned along said plurality of conductors in association with the distribution of said particular locations.

11. Method in accordance with claim 1, wherein a plurality of sensors are positioned along the core of said plurality of conductors in association with the distribution of said particular locations.

* * * * *